(12) United States Patent
Abdulkader et al.

(10) Patent No.: US 7,646,913 B2
(45) Date of Patent: Jan. 12, 2010

(54) ALLOGRAPH BASED WRITER ADAPTATION FOR HANDWRITTEN CHARACTER RECOGNITION

(75) Inventors: Ahmad A. Abdulkader, Woodinville, WA (US); Kumar H. Chellapilla, Redmond, WA (US); Patrice Y. Simmard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 11/305,968

(22) Filed: Dec. 19, 2005

(65) Prior Publication Data

US 2007/0140561 A1 Jun. 21, 2007

(51) Int. Cl.
G06K 9/00 (2006.01)

(52) U.S. Cl. .................. 382/187; 382/119; 382/159; 382/186

(58) Field of Classification Search ............... 382/119, 382/186, 187, 159; 345/467
See application file for complete search history.

(56) References Cited

U.S. PATENT DOCUMENTS

| | | | |
|---|---|---|---|
| 4,701,960 A | 10/1987 | Scott | |
| 5,040,222 A | 8/1991 | Muroya | |
| 5,050,219 A | 9/1991 | Maury | |
| 5,105,468 A | 4/1992 | Guyon et al. | |
| 5,285,506 A | 2/1994 | Crooks et al. | |
| 5,287,417 A | 2/1994 | Eller et al. | |
| 5,365,598 A | 11/1994 | Sklarew | |
| 5,369,737 A | 11/1994 | Gholizadeh et al. | |
| 5,442,715 A | 8/1995 | Gaborski et al. | |
| 5,491,758 A | 2/1996 | Bellegarda et al. | |
| 5,502,774 A | 3/1996 | Bellegarda et al. | |
| 5,528,699 A | 6/1996 | Obata et al. | |
| 5,544,257 A | 8/1996 | Bellegarda et al. | |
| 5,644,652 A * | 7/1997 | Bellegarda et al. | 382/186 |
| 5,649,068 A * | 7/1997 | Boser et al. | 706/12 |
| 5,764,797 A | 6/1998 | Adcock | |
| 5,832,108 A * | 11/1998 | Fukita et al. | 382/159 |
| 5,884,294 A * | 3/1999 | Kadar et al. | 706/10 |
| 5,889,523 A | 3/1999 | Wilcox et al. | |
| 6,028,959 A * | 2/2000 | Wang et al. | 382/185 |
| 6,094,506 A | 7/2000 | Hullender | |
| 6,320,985 B1 | 11/2001 | Perrone et al. | |
| 7,336,827 B2 * | 2/2008 | Geiger et al. | 382/186 |
| 7,469,062 B2 * | 12/2008 | Napper | 382/186 |
| 2005/0163377 A1 * | 7/2005 | Walch | 382/187 |
| 2007/0014475 A1 * | 1/2007 | Prymus et al. | 382/186 |
| 2007/0140561 A1 * | 6/2007 | Abdulkader et al. | 382/187 |
| 2008/0025610 A1 * | 1/2008 | Abdulkader | 382/185 |

OTHER PUBLICATIONS

Matic, Guyon, Denker, and Vapnik. "Writer-adaptation for on-line Handwritten Character Recognition." (1993).

(Continued)

Primary Examiner—Gregory M Desire
(74) Attorney, Agent, or Firm—Lee & Hayes, PLLC

(57) ABSTRACT

The claimed subject matter provides a system and/or a method that facilitates analyzing and/or recognizing a handwritten character. An interface component can receive at least one handwritten character. A personalization component can train a classifier based on an allograph related to a handwriting style to provide handwriting recognition for the at least one handwritten character. In addition, the personalization component can employ any suitable combiner to provide optimized recognition.

20 Claims, 14 Drawing Sheets

OTHER PUBLICATIONS

Connell and Jain. "Writer Adaptation for Online Handwriting Recognition."IEEE Trans. On Pattern Analysis and Machine Intelligence, vol. 24, No. 3. (2002) pp. 329-346.

Vuurpijl and Schomaker. "Finding Structure in Diversity: A Hierarchical Clustering Method for the Catergorization of Allographs in Handwriting." (Proceedings of the International Conference on Document Analysis and Recognition, 1997) pp. 387-393.

Crettez, Jean-Pierre."A Set of Handwriting Families: Style Recognition." Third International Conference on Document Analysis and Recognition. IEEE Computer Society Press, Montreal. (Aug. 1995) pp. 489-494.

Vuurpijl and Shomaker. "Coarse Writing-Style Clustering based on Simple Strok-Related Features." (Proceedings of the 5th IWFHR, Sep. 1996). pp. 29-34.

U.S. Appl. No. 11/305,968, filed Dec. 19, 2005, Guhu, Angshuman.

International Search Report dated and mailed May 9, 2007 for PCT Application Serial No. 2006/048404, 3 pages.

* cited by examiner

400 →

| | | | | | |
|---|---|---|---|---|---|
| | | | | | |
| 1.6% Modern | 5.4% N/A | 4.0% Simple Cursive | 39.0% Modern Cursive | 19.8% N/A | 30.1% Italic Cursive |
| | | | | | |
| 1.1% N/A | 5.9% Modern | 5.4% Simple | 41.6% Italic | 43.6% Manu-script | 3.7% Modern Cursive |
| | | | | | |
| 1.0% Simple | 4.0% Simple | 1.3% Simple | 7.1% Modern Cursive | 49.5% Simple | 36.8% Simple |

402 →

| | | | | | |
|---|---|---|---|---|---|
| | | | | | |
| 1.3% | 1.8% | 55.2% | 40.9% | | |
| | | | | | |
| 6.3% | 2.1% | 85.0% | 4.9% | | |
| | | | | | |
| 1.0% | 11.0% | 1.2% | 2.6% | 52.1% | 30.1% |

FIG. 4

ALLOGRAPH BASED WRITER ADAPTATION FOR HANDWRITTEN CHARACTER RECOGNITION

CROSS REFERENCE TO RELATED APPLICATION(S)

This application relates to U.S. Pat. No. 5,764,797, entitled, "METHOD AND SYSTEM FOR MODELING HANDWRITING USING POLYNOMIALS AS TIME," issued Jun. 9, 1998 as well as U.S. patent application Ser. No. 11/215,818, entitled, "STYLE AWARE USE OF WRITING INPUT" filed Aug. 29, 2005.

BACKGROUND

Technological advances in computer hardware, software, and networking have lead to efficient, cost effective computing systems (e.g., desktop computers, laptops, handhelds, cell phones, servers . . . ) that can communicate with each other from essentially anywhere in the world. Such systems continue to evolve into more reliable, robust and user-friendly systems. As a consequence, more and more industries and consumers are purchasing computers and utilizing them as viable electronic alternatives to traditional paper and verbal media for exchanging information. Many industries and consumers are leveraging computing technology to improve efficiency and decrease cost. For instance, consumers can scan and store documents, create an album of digital images with text overlays, search and retrieve specific information (e.g., web pages with various types of data), upload pictures from digital cameras, view financial statements, transmit and/or receive digital facsimiles, exchange correspondence (e.g., email, chat rooms, voice over IP . . . ), etc.

As a result, such computing systems and/or devices have incorporated a variety of techniques and/or methods for inputting information. Computing systems and/or devices facilitate entering information utilizing devices such as, but not limited to, keyboards, keypads, touch pads, touch-screens, speakers, stylus' (e.g., wands), writing pads, . . . However, input devices that leverage user handwriting bring forth user personalization deficiencies in which each user can not utilize the data entry technique (e.g., writing) similarly.

A user's handwriting can be as unique as the user, wherein such uniqueness can be used for identification purposes. Commercial handwriting recognition systems implemented within various computing systems and/or devices attempt to reduce the impact of writer variation through utilizing large training datasets including data from a plurality of disparate users. Even when handwriting samples from as many as 1500 users are available, there is sufficient variation in the handwriting to uniquely identify each of the users.

From a machine learning perspective, such variation makes handwriting recognition difficult for computers. While intra-user characters (e.g., from the same user) have small variations, inter-user characters (e.g., from different users) have large variations and contribute to recognition errors. As a result, learning from training data obtained from one set of users (even hundreds of users) does not necessarily produce models that generalize well to unseen handwriting styles. The computer recognition experience using a generic (e.g., writer-independent) recognizer can be especially poor for users with rare writing styles. One explanation for the poor performance can be that the trained generic recognizer is incomplete as it has not learned to recognize unseen user's writing style(s).

A pragmatic approach to improving recognizer performance on unseen writing styles is writer adaptation (or personalization). Personalization enables the recognizer to adapt to a particular user's handwriting by collecting and learning from additional data samples from the user. Clearly, there is a trade off between the number of training samples needed from the user, the achieved reduction in error rate, and the perceived inconvenience to the user. The larger the amount of training data, the better the personalized recognizer, but the more inconvenience for the user based on input of samples, and/or training utilizing such samples.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate recognizing a character associated with handwriting utilizing an allograph (e.g., character shapes and/or styles) trained classifier. A personalization component can receive data related to a handwritten character via an interface, wherein the personalization component can provide optimized recognition for the handwritten character by employing a classifier trained with allograph data. The allograph data can be, for instance, automatically generated and/or manually generated data related to a style of handwriting. The personalization component can provide writer adaptation, wherein writer adaptation can be the process of converting a generic (e.g., writer-independent) handwriting recognizer into a personalized (e.g., writer dependent) recognizer with improved accuracy for any particular user.

Furthermore, the personalization component provides optimized handwriting recognition by employing a first classifier trained with allograph data and a second classifier trained with non-allograph data, wherein the first classifier and the second classifier output can be combined. The combination of the outputs can be implemented by, for instance, a linear combiner, a combiner classifier, a support vector machine, a linear classifier, a sequence of rules, etc. The combination of the outputs provides enhanced recognition and/or analysis of handwriting. Moreover, the employment of the combination of outputs can be optimized by utilizing a user handwriting sample.

In accordance with one aspect of the claimed subject matter, the personalization component can further utilize an allograph component that generates allograph data to train at least one classifier to provide optimized handwriting recognition. The allograph component can generate allograph data automatically, manually, and/or any combination thereof. For instance, clustering can be implemented to automatically identify allographs (e.g., character shapes and/or styles) and/or allograph data from handwritten characters. In another example, the allograph data can be manually provided utilizing a handwriting expert to provide types and/or styles associated with handwriting. Furthermore, the allograph component can identify character writing styles (e.g., allographs and/or allograph data) using, for example, a hierarchical agglomerative clustering approach using dynamic time warping (DTW) as a distance measure.

In accordance with another aspect of the claimed subject matter, the personalization component can further utilize a classifier component to employ at least one classifier in accordance with the subject innovation. The classifier component can employ a first classifier that can be trained with allograph data. For instance, the first classifier can be a neural network. The classifier component can further employ a second classifier that can be trained with non-allograph data. By employing both the first and second classifiers, disparate outputs can be combined utilizing a combine component. The combine component can utilize various combining technologies such as a linear combiner, a combiner classifier, a linear classifier, a support vector machine, etc. In other aspects of the claimed subject matter, methods are provided that facilitate analyzing a handwritten character associated with a particular user.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 4 illustrates a block diagram of tables associated with various handwriting styles that can be utilized in accordance with the claimed subject matter.

DETAILED DESCRIPTION

Figure 1:
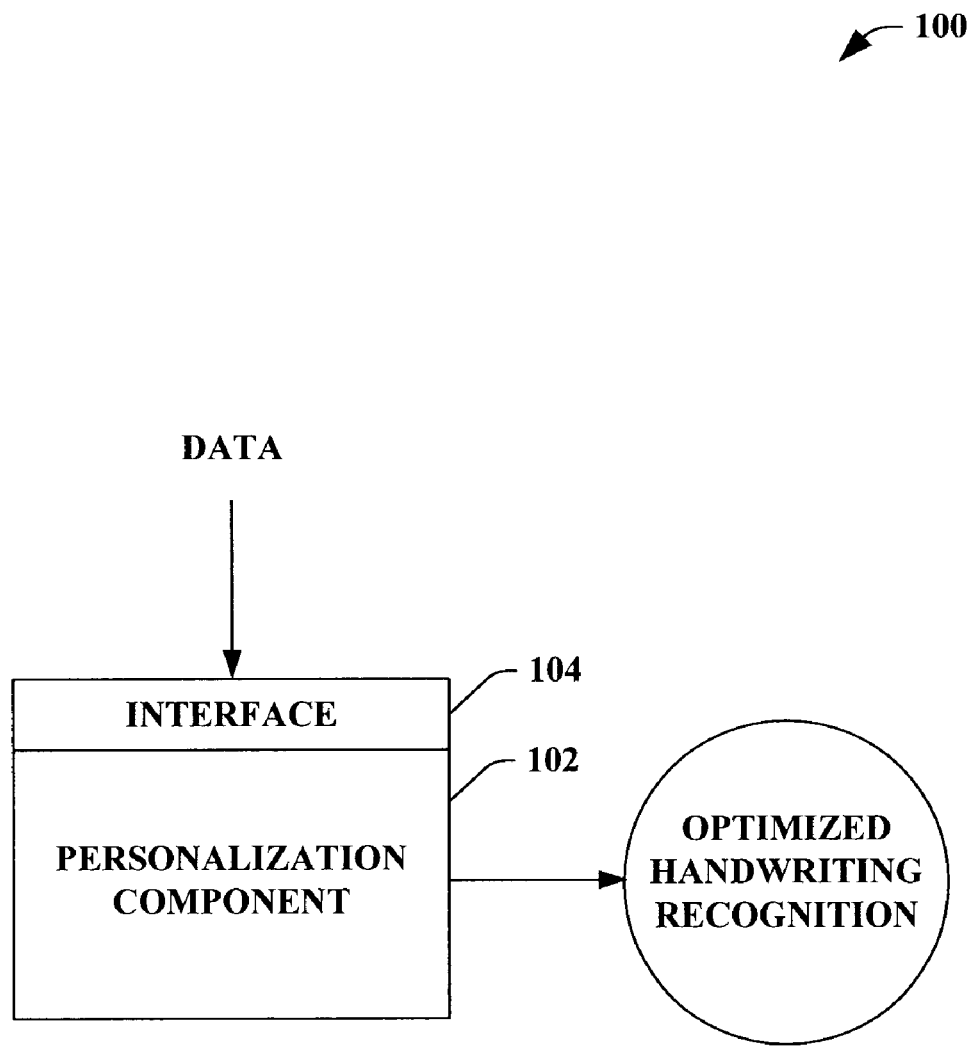
FIG. 1 illustrates a block diagram of an exemplary system that facilitates recognizing a character associated with handwriting utilizing an allograph trained classifier.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates recognizing a character associated with handwriting utilizing an allograph trained classifier. The system 100 can include a personalization component 102 that can train a classifier (not shown) with allograph data, wherein such training facilitates recognizing handwritten characters. The allograph data can be, for instance, automatically generated and/or manually generated data related to a style of handwriting. The personalization component 102 can receive a handwritten character and/or data related to a handwriting sample via an interface component 104 (herein referred to as the "interface 104") and provide optimized handwriting recognition based at least in part upon the employment of allograph data in training of a classifier. For instance, the data received can be any character and/or input from a user that is handwritten. For instance, various computing devices and/or systems utilize handwriting inputs such as, but not limited to, tablets, portable data assistants (PDA's), mobile communication devices, a stylus pen, a wand, an interactive display device with touch screen ability, etc.

The personalization component 102 can provide writer adaptation, wherein writer adaptation can be the process of converting a generic (e.g., writer-independent) handwriting recognizer into a personalized (e.g., writer dependent) recognizer with improved accuracy for any particular user. The personalization component 102 can implement the adaptation technique with a few samples from a particular user, while as conventional techniques train the generic recognizer employing large amounts of data from several writers and/or users.

The allograph data can be generated manually, automatically, and/or any combination thereof. For instance, the allograph data can be automatically generated employing any suitable clustering technique (discussed infra). In other words, an automatic approach for identifying allographs (e.g., character shapes and/or styles) from handwritten characters through clustering can be implemented. In another example, the allograph data can be manually provided utilizing a handwriting expert to provide types and/or styles associated with handwriting.

In addition, the personalization component 102 can train a classifier with allograph data and implement such results in combination with a non-allograph based classifier to provide the optimized handwriting recognition. In other words, the personalization component 102 can seamlessly integrate with an existing recognizer (e.g., handwriting character recognizer) and improve upon it equilaterally employing new samples from an individual. For instance, rather than simply matching a letter, the personalization component 102 can match a letter and/or character with a particular style and/or allograph. Thus, the personalization component 102 can utilize a mapping technique and/or function that can be learnable given writing samples and/or examples of the user. The personalization component 102 can utilize an output from a conventional and/or traditional classifier to apply the mapping function and/or technique to provide a probability of each letter and/or character to optimize handwriting recognition.

Moreover, the system 100 can include any suitable and/or necessary interface component 104, which provides various adapters, connectors, channels, communication paths, etc. to integrate the personalization component 102 into virtually any operating and/or database system(s). In addition, the interface component 104 can provide various adapters, connectors, channels, communication paths, etc., that provide for interaction with the personalization component 102, the data, handwriting data, data associated with optimized handwriting recognition, and optimized handwriting recognition.

Figure 2:
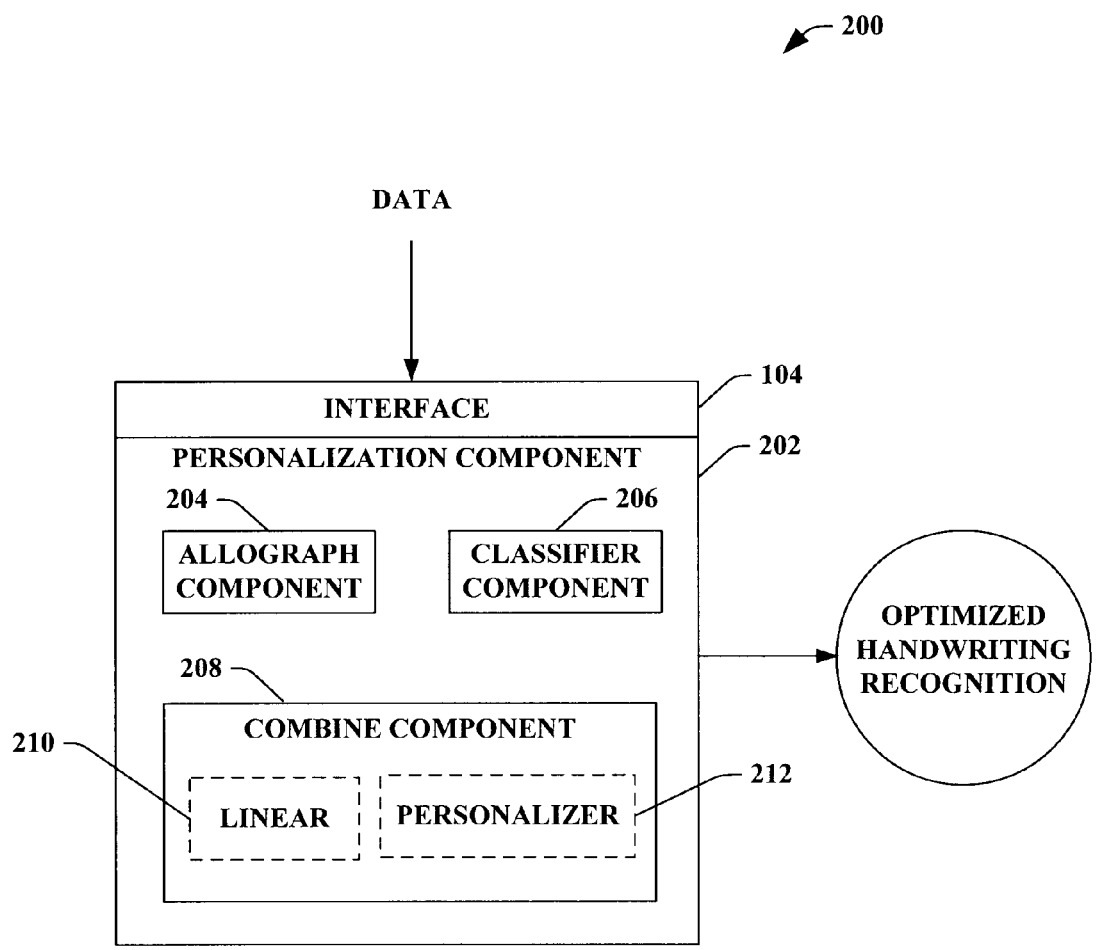
FIG. 2 illustrates a block diagram of an exemplary system that facilitates utilizing allograph data to employ handwriting character recognition.

FIG. 2 illustrates a system 200 that facilitates utilizing allograph data to employ handwriting character recognition. The system 200 can include a personalization component 202 that can provide optimized handwriting recognition by training a classifier utilizing allograph data. The personalization component 202 can receive data related to a handwritten character and/or symbol via the interface 104, wherein the personalization component 202 can infer and/or recognize the character and/or symbol by employing a classifier trained by allographs. In addition, the personalization component 202 can further utilize the classifier trained by allographs in connection with a classifier trained with non-allographs. It is to be appreciated that the personalization component 202 can be substantially similar to the personalization component 102 as described in FIG. 1.

The personalization component 202 can include an allograph component 204 that can automatically, manually, and/or any combination thereof generate allographs and/or allograph data. An automatic approach for identifying allographs (e.g., character shapes and/or styles) from handwritten characters through clustering can be implemented. In another example, the allograph data can be manually provided utilizing a handwriting expert to provide types and/or styles associated with handwriting.

Furthermore, the allograph component 204 can identify character writing styles (e.g., allographs) using, for example, a hierarchical agglomerative clustering approach using dynamic time warping (DTW) as a distance measure. The allograph component 204 can identify and/or find any suitable allograph data and/or writing styles to be employed in accordance with the subject innovation. A huge variation in writing styles exists within the domain of Western, Latin based handwriting. However, handwritten character styles can exist that can be termed "allographs" that a user can loosely adhere. There have been attempts to build a catalog of western handwritten styles, but none exist to date. This can be contrary to machine print fonts, for example, where there can be a pseudo-standard taxonomy of fonts and styles. Nonetheless, within the school system of any specific country, there are a handful of handwriting styles that are taught, with a particular style being adopted in any given school district.

Hierarchical clustering techniques can be used to learn letter handwriting styles from data. Two main approaches exist: 1) a top down approach of detecting coarse sub-styles; and 2) a bottom-up clustering approach. The allograph component 204 can adopt the bottom-up approach, for instance, based at least in part upon obtained style knowledge can be directly used in the system 200 (e.g., the recognizer).

A clustering C of handwritten letters $X=\{x^1, x^2, \ldots, x^M\}$ can define a partitioning of the data into a set $\{c^1, c^2, \ldots, c^K\}$ of K disjoint sets, such that $$\bigcup_{k=1}^{K} c^k = X.$$

The clustering C is computed independently for every letter and/or symbol. An hierarchical clustering algorithm produces an hierarchy of nested clusters $[C_1, C_2, \ldots, C_M]$ such that $C_{m-1}$ is a subset of $C_m$. This hierarchy can be built in M steps, where a clustering at step m can be produced from the clustering produced at step m−1. At step 1, every member and/or a portion of the member in the sample set X can represent a cluster of its own. Using a dissimilarity function $D(c^k, c^{k'})$ of two clusters, the following algorithm can be applied by the allograph component 204: a) Initialize $C_1=\{\{x^1\},\{x^2\},\ldots,\{x^M\}\}$, where each sample is a cluster by itself, and b) For m=2, . . . , M: obtain the new clustering $C_m$ by merging the two most similar clusters $c^{kmin}$ and $c^{k'min}$ of $C_{m-1}$. The closest clusters can be defined by $(kmin, k'min)=\arg\min_{(k, k'), k \neq k'} D(c^k, c^{k'})$.

The cluster dissimilarity function $D(c^k, c^{k'})$ can be defined in terms of the ink sample dissimilarity function $D(x^k, x^{k'})$. Each ink sample can be first isotropically normalized and centered within a fixed size rectangle. For ink samples k (including, for instance, S strokes), and k' (including, for instance, S' strokes), $$D(x^k, x^{k'}) = \begin{cases} \infty, & \text{if } S \neq S' \\ \dfrac{\sum_{n=1}^{N} |P_n, P'_n|}{s}, & \text{if } S = S' \end{cases}$$

where P and P' are the corresponding re-sampled coordinate vectors of samples k, k' and N is the number of sampling points. An element p in the vector P has 3 co-ordinates (x, y, θ) where x, y are the Cartesian coordinates of the point p and θ is the estimate of the slope at the same point.

With this definition, ink samples with different stroke counts may not be merged in the same cluster until the very end. At that point the merging would have actually stopped.

$$D(c^k, c^{k'}) = \max_{\forall x^k \in c^k, \forall x^{k'} \in c^{k'}} D(x^k, x^{k'})$$

It is to be appreciated that utilizing the maximum rather than average or the minimum to define the distance between two ink samples with a different number of strokes to ∞ favors compact clusters.

For visualization purposes, an ink sample can be selected to be the cluster representative. The chosen representative for every cluster can be the median center of the cluster. The median center $x^{-k}$ for cluster $c^k$ can be defined as the ink sample with the smallest median distance with respect to the remaining cluster member ink samples.

$$\underset{x \in c^k, x \neq x^{-k}}{med}(D(x^{-k}, x)) \leq \underset{x \in c^k, x \neq x'}{med}(D(x', x)), \forall x' \in c^k$$

Figure 3:
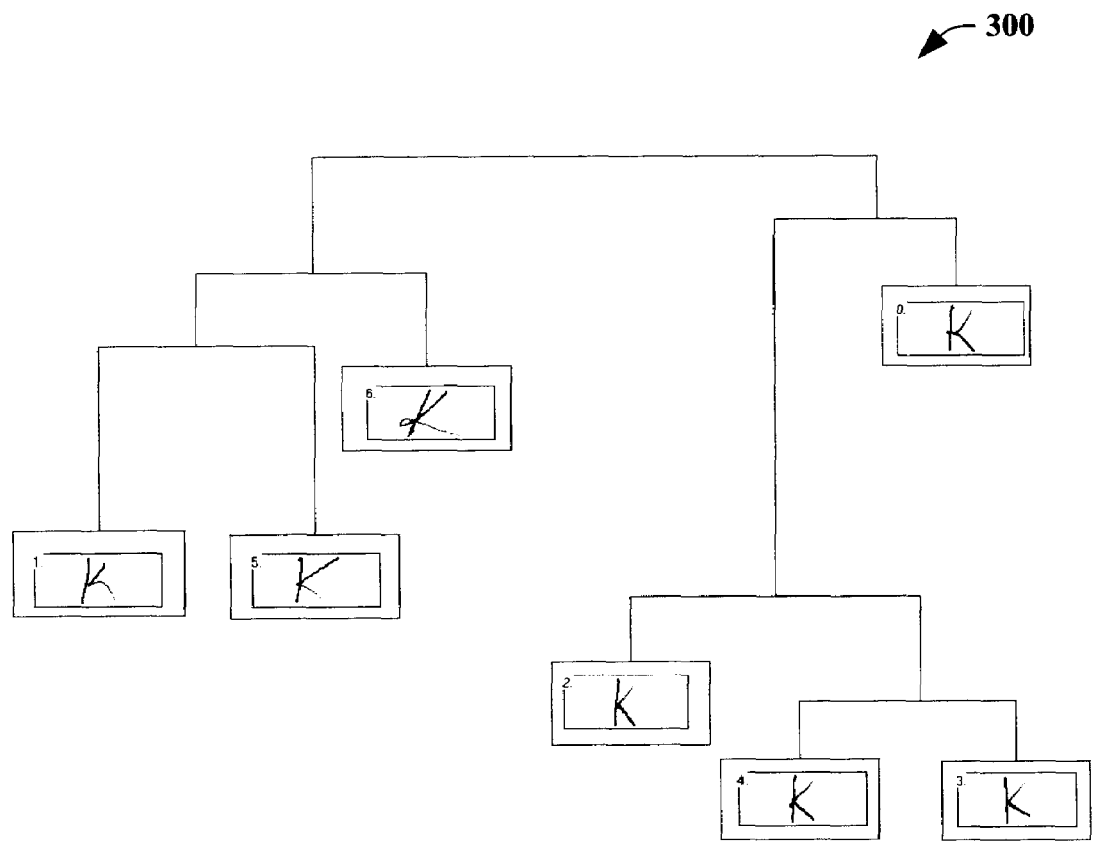
FIG. 3 illustrates a block diagram of binary tree that facilitates visualizing results associated with clustering for a character.

Referring to FIG. 3 briefly, FIG. 3 illustrates a block diagram of binary tree 300 that facilitates visualizing results associated with clustering for a character. The results from the allograph component 204 that can be related to the clustering for each letter and/or symbol can be visualized by the binary tree 300, referred to as a dissimilarity dendogram. The binary tree 300 can be an example of the resulting dendogram of the letter "K." It is to be appreciated the binary tree 300 can incorporate the order in which a stroke occurs and/or a darkness and/or lightness associated with a tone of the stroke.

The allograph component 204 can automatically generate clusters related to allographs and further determine the number of clusters employed For instance, the number of clusters for every letter and/or symbol can be determined by defining a threshold $D_{max}$ above which no further merging of clusters can occur. In other words, the active clusters at the time that merging stops represent the styles of the corresponding letter. Accordingly, the number of resulting styles can be different from one letter to the other, depending on the diversity of the letter and/or symbol shapes.

Briefly turning to FIG. 4, a first table 400 and a second table 402 associated with various handwriting styles that can be utilized in accordance with the claimed subject matter. The first table 400 can be the result of the hierarchical clustering algorithm utilized by the allograph component 204 when applied to a large set of ink samples. The first table 400 illustrates the resulting styles for the letters q, t, and X and relative frequencies among United States (US) writers. It is to be appreciated that the first table 400 is an example, and the subject innovation is not so limited. In other words, the personalization component 202 can map these styles to the styles taught in US schools.

Furthermore, it is to be appreciated and understood that the known school handwriting style standards describe the way a letter looks like in its final form without considering how a letter is drawn. Yet, the stroke order and the stroke direction (trajectory) can provide valuable information that can be considered during the clustering phase as described above by the allograph component 204.

The second table 402 illustrates examples of the styles for the letters q, t, and X and their relative frequencies among United Kingdom (UK) writers. By comparing the US and UK styles (e.g., first table 400 and second table 402 respectively), the following subjective observations can be made: 1) The dominant styles in both sets appear to be the same for most of the letters albeit with different frequencies (e.g., the shown US and UK styles for the letter q can illustrate a counter-example; 2) Some fringe (e.g., low frequency) styles can exist in one set and not in the other; and 3) Even when fringe styles appear in both sets, it seems their frequencies can be significantly different.

Each choice of a DTW distance threshold when applied to the hierarchical cluster can allow the allograph component 204 of FIG. 2 to produce a set of disjoint clusters. The larger the distance threshold, the fewer the number of clusters obtained. For example, a threshold of 792 can be chosen to obtain 2002 unique clusters for the 100 characters (e.g., printable ASCII characters including the euro and pound signs). With 2002 clusters and 100 characters, there can be approximately 20 allographs per character representing various written forms of the character.

Turning back to FIG. 2, the personalization component 202 can include a classifier component 206 that can employ at least one classifier to be trained utilizing allograph data generated from the allograph component 204. In addition, the classifier component 206 can utilize a first neural network classifier that can be trained on allograph data and a second neural network classifier that can be trained on non-allograph data, wherein both outputs of the first and second neural network classifiers can be combined by employing a combine component 208 (discussed infra). It is to be appreciated that the classifier component 206 can include any suitable components and/or data related to training a classifier utilizing non-allograph data, allograph data, and/or any combination thereof.

Furthermore, the classifier component 206 can employ a feature vector as an input for the at least one classifier. Each handwritten character can be viewed as a sequence of (x,y,t) segments representing continuous strokes. One or more strokes written in succession can make up a character. For instance, each handwritten character can be processed to obtain sixty five (65) polynomial features. It is to be appreciated that any suitable and/or alternative "featurizing" can be applied and utilized in association with the claimed subject matter.

The ink for the characters can first be split into various segments, by cutting the ink at the bottoms of the characters. Segmentation thus takes place where the y-coordinate reaches a minimum value and starts to move in the other direction. Each of the segments can then be represented in the form of a Chebyshev polynomial. A feature vector containing 65 features can be obtained from each character. These feature vectors are then fed as inputs to each of the neural networks associated with the classifier component 206.

The classifier component 206 can further train the at least one classifier utilizing at least one of allograph data and a feature vector. It is to be appreciated that the classifier component 206 can employ a first recognizer and a second recognizer, wherein the first and second recognizer can be trained utilizing the feature vectors. However, it is also to be appreciated and understood that the subject innovation is not so limited by the following example. In other words, the classifier component 206 can employ at least one classifier trained utilizing allograph data to provide optimized handwriting recognition.

Figure 5:
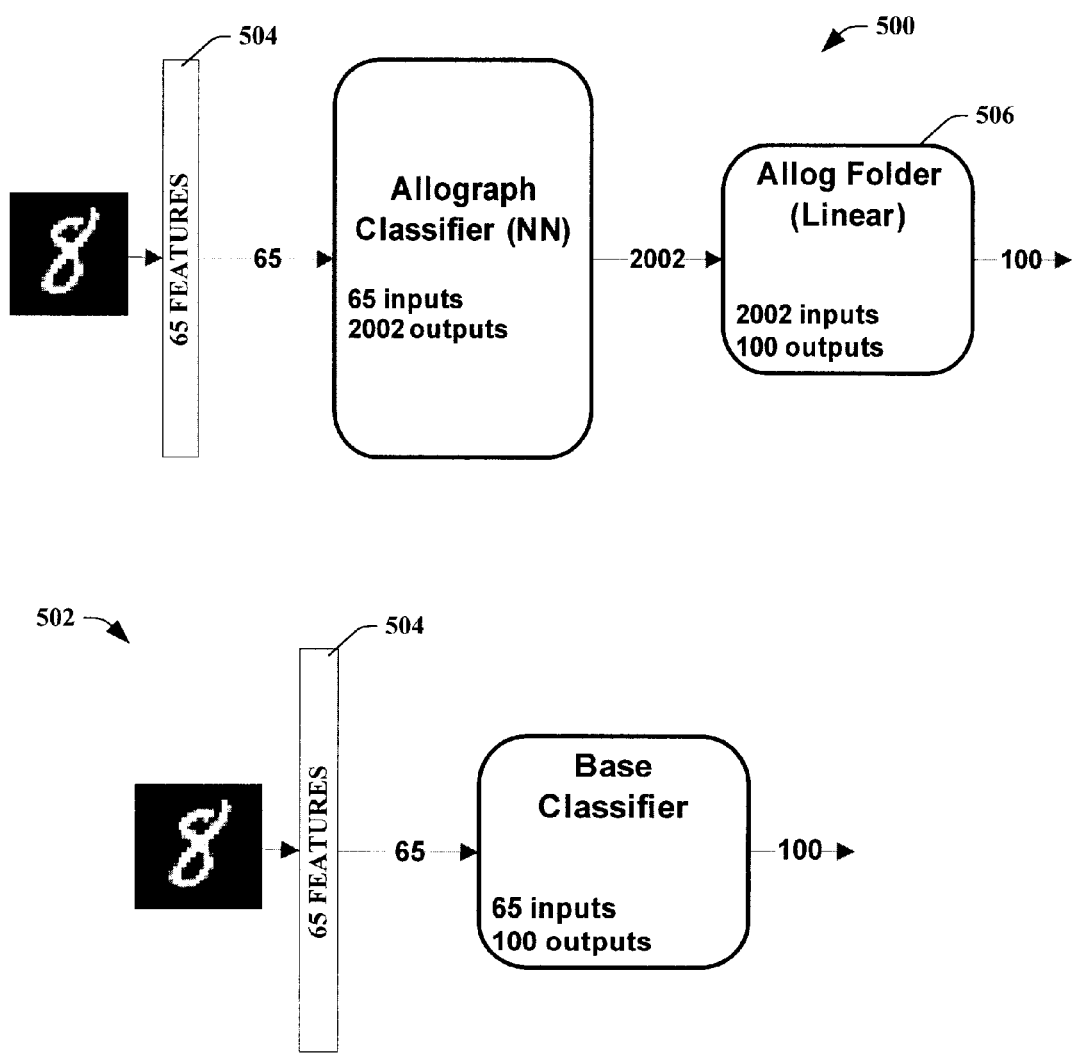
FIG. 5 illustrates a block diagram of an exemplary system that facilitates utilizing an allograph classifier and a base classifier.

Turning to FIG. 5, a first recognizer 500 (e.g., a neural network allograph-neural network (NN)) is illustrated that includes a neural network and a linear classifier in a cascade.

The neural network 500 has 2002 outputs and can be trained to map the character feature vector 504 to character allographs. A linear combiner (allograph-folder) 506 can be trained using gradient descent to fold the 2002 allographs back into the 100 character classes. The linear folder 506 can be considered to be a part of the allograph-NN. A second recognizer 502 can be a neural network (e.g., base-NN) that does not use allograph information and can be trained to directly map the feature vectors 504 to the output classes. Both neural networks can be multi-layer-perceptrons (MLP) with two layers each. While the allograph-NN 500 can have 1024 hidden nodes, the base-NN 502 can have 600 hidden nodes. It is to be appreciated and understood that back propagation can be used to train the neural networks with cross-entropy as the error function.

Referring back to FIG. 2, the personalization component 202 can include the combine component 208 to combine the outputs associated with the at least one classifier utilized by the classifier component 206. It is to be noted that the two neural networks (e.g., the allograph-NN 500 and the base-NN 502 of FIG. 5) have disparate architectures. Further, the allograph-NN 500 can be trained using allograph data, while the latter may not. Due to these differences, the errors made by these two classifiers can be expected to be significantly different. Thus, any combiner built and/or employed by the combine component 208 using these two classifiers will likely have a lower error rate than either of them.

In one example, the combine component 208 can employ a linear technique 210 to combine at least two sets of outputs. A simple linear classifier (e.g., lin-combiner that can be a linear technique 210) can combine the outputs of the allograph-NN and the base-NN which includes the writer-independent (un-personalized) recognizer. To further improve accuracy, the allograph classifier outputs can also be directly fed into the combine component 208.

In another example, the combine component 208 can utilize a personalizer technique 212 to combine the outputs associated with at least two classifiers. The personalizer technique 212 can adapt to the writer-independent recognizer to the current user providing new training samples. In other words, the personalizer technique 212 can be in cascade with the two neural networks (discussed supra), wherein the linear combiner (e.g., instantiated by the linear technique 210) can be replaced by the personalizer technique 212 such that the outputs from the neural networks are received and utilized by the personalizer technique 212.

It is to be appreciated that although the personalizer technique 212 can replace the linear technique 210, any suitable combiner classifier and/or technique that can learn from data can be utilized to replace the linear combiner. Any suitable combiner classifier can be employed by the combine component 208, wherein such combiner classifier can learn from data (e.g., when replacing the linear technique 210). It is to be appreciated and understood that a support vector machine (SVMs) can be chosen for the personalizer technique 212 for at least the following reasons: 1) Generalization—SVMs are well known for generalization properties. Since, the number of samples collected (per class) from the user can be very small (e.g., typically less, for example, than 10 or 15), it is important that generalization can be achieved with such few samples. In contrast to SVMs, training neural networks to generalize well with very limited training data can be challenging; 2) Regularization—The most common approach to achieving good generalization with small data sets can be regularization. SVMs provide a natural way of regularization. The model selection process can be used to effectively control capacity and reduce the chances of over-fitting; 3) Multi-class—Currently, multi-class SVMs can be built using several two-class SVMs. This can allow for finer control on accuracy on a per class basis. Since only the linear combiner can be personalized, not all two-class SVMs may be necessary. One can simply focus on including those pairs of classes that have the highest confusion; 4) Complexity—When the one-vs-one approach is used, the number of two class classifiers grows proportional to C(n,2) (e.g., $O(n^2)$). The support vectors in an SVM can be a subset of user provided samples. Thus, even though the number of possible classes and classifiers grows quickly, the total number of support vectors can be bounded by the number of user samples, which can be small. Further, since the combiner may be personalized, a small subset of the C(n,2) classifiers may be built. Each of the dropped classifiers can be represented by a single bit indicating that the unpersonalized recognizer's output is to be used instead (e.g., for dropping pairs, during the SVM voting, the corresponding pair of unpersonalized combiner's outputs can be compared to obtain the vote).

Figure 6:
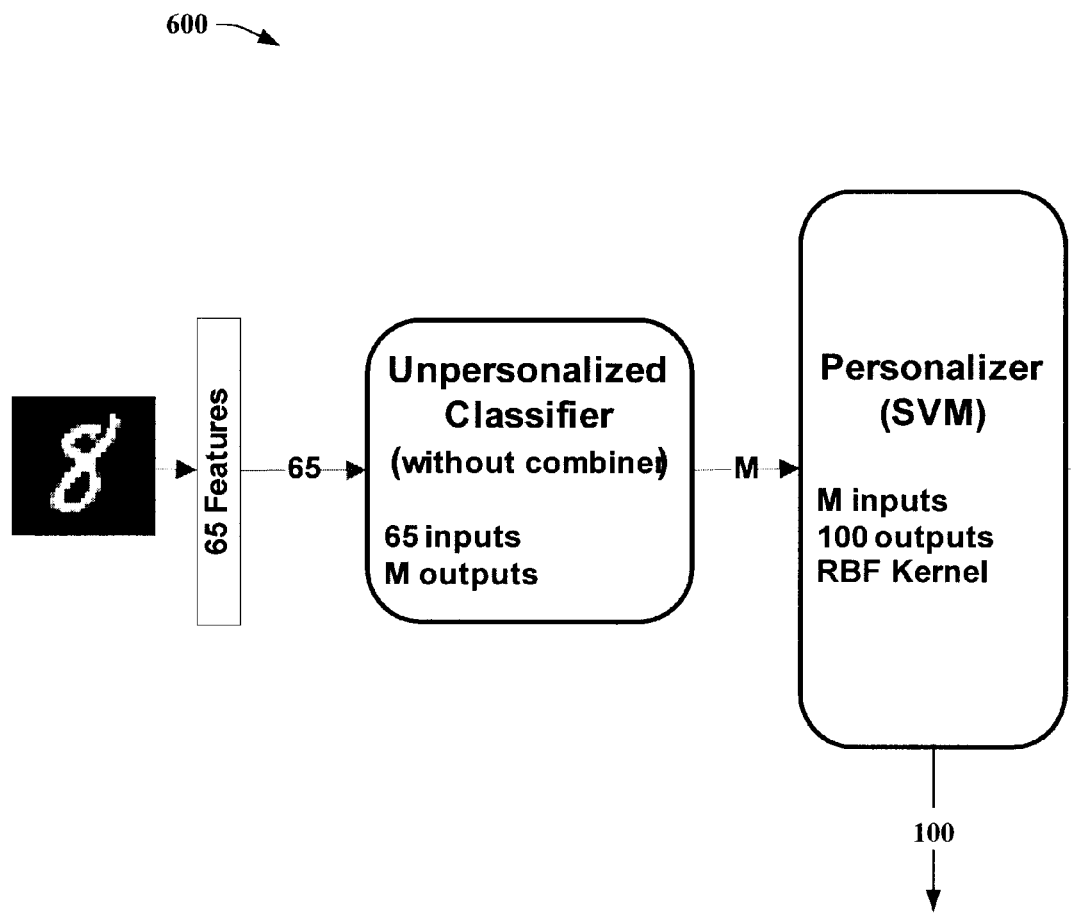
FIG. 6 illustrates a block diagram of an exemplary system that facilitates employing a personalizer support vector machine in accordance with the subject innovation.

Briefly referring to FIG. 6, a block diagram of an exemplary system 600 that facilitates employing a personalizer support vector machine in accordance with the subject innovation. Thus, the personalizer (SVM) can replace the linear technique as described above.

The system 200 can utilize various data sets to provide experimental results. For example, the following data sets can be utilized in the providing the optimized handwriting recognition (e.g., personalization experiments). 1) The first set (e.g., non-personalization set) included 200,000 handwritten characters from 215 users. The non-personalization data can be used for building the unpersonalized recognizer. 2) The second set (e.g., personalization set) included 84,000 samples from 21 users (e.g., not included in the 215 users from the first set). The personalization set can be designed for evaluating the personalization technique.

Data in both sets can be uniformly distributed over 100 possible western handwritten character classes given by the following:

ABCDEFGHIJKLMNOPQRSTUVWXYZ
abcdefghijklmnopqrstuvwxyz
0123456789
!"#$%& '( )*+,-./:;<=>?@[\]^_{|}~¢£¥§°±€

Ink samples in both the datasets can be featurized (discussed above with a feature vector) to obtain feature vectors describing the characters as employed by the allograph component 204. The feature vectors can be used to build the recognizers as described supra.

The 200,000 ink samples from the non-personalization set can be hierarchically clustered as described above with the allograph component 204. A threshold of, for example, 792 can be implemented to obtain 2002 allographs. These clusters can be used to assign allograph labels for each of the 200,000 samples.

A generic recognizer can include two classifiers: a) the allograph-NN (which also includes the allograph-folder), and b) the base-NN. The non-personalization set can be shuffled and split into 3 parts: 160,000 samples to be used for training, 20,000 samples to be used for validation (e.g., to determine when to stop training), and the remaining 20,000 samples to be used for testing. The reported accuracies for the generic recognizer on the non-personalization data set are the ones from the 20,000 test set. In each of the figures, the first percentage value indicated on a classifier is the error rate on the test set.

The allograph-NN (See FIG. 5, 500 for an example) can be a two layered multi-layer perceptron (e.g., tanh nonlinearity)

with 1024 nodes in the hidden layer and 2002 output nodes (e.g., one per allograph). The allograph-folder can be a simple linear combiner that maps the allograph-NN outputs to the 100 output classes. The base-NN (See FIG. 5, 502 for an example) can also be a two layered multi-layer perceptron (e.g., tanh nonlinearity) with 600 hidden nodes and 100 outputs (e.g., one per output class).

The classifiers (e.g., allograph-NN, allograph-folder, and base-NN) can be independently trained on the non-personalization set using, for instance, backpropagation and cross-entropy as the error measure. All weights can be initialized uniformly at random in, for instance, [−0.05,0.05], and a learning rate of, for instance, 0.001 was used in the following experiments.

A generic combiner can be a simple linear classifier with 2202 inputs and 100 outputs. The generic combiner inputs including the outputs of the allograph-NN (2002), the allograph-folder (100) and the base-NN (100).

A personalizer can be a 100-class SVM using up to C(100, 2)=4950 2-class SVMs. A unique personalizer can be trained for each of the 21 users. The 84,000 samples in the personalization data set can produce 40 samples per character for each of the 21 users. Up to 15 samples per character can be used to train the personalizer. The remaining 25 samples per character can be used purely for testing purposes. It is to be appreciated that a typical user may not provide more than 15 samples per character for training the personalizer. However, having a large test set (e.g., 30 samples per char) can provide a reliable manner of evaluating the performance of the personalized recognizer.

Three different personalizers can be built for each user, utilizing k=5, 10, and 15 user samples (per class). These k-sample sets can be incrementally selected (e.g., for example the k=10 set can be obtained by adding five new sample to the k=5 set). The k samples can be used to not only train the recognizer, but also regularize it. ceil(k/2) samples can be used for training and floor(k/2) samples can be used for model selection. A RBF kernel was implemented as shown in FIG. 6. SVM model selection can be performed using, for instance, a simple grid-search with C in $\{2^{-5}, 2^{-4}, \ldots, 2^{14}, 2^{15}\}$ and γ in $\{2^{-10}, 2^{-9}, \ldots, 2^3, 2^4\}$. The (C,γ) parameters from the model that gave the best error rate on the floor(k/2) samples (e.g., not used for training the SVM) can be chosen for the personalizer. This error rate is reported as the error rate of the personalized recognizer (discussed infra).

The base-NN (as seen in FIG. 5, at 502) can be trained on the non-personalized dataset (e.g., containing 215 users) and achieved a test error rate of 7.8%. When tested on data from the 21 users in the personalized dataset (not included in the 215 users), the error rate increased to 9.36%. This is a relative increase of 20% in the error rate. Such a large increase in the error rate clearly indicates that the inter-user variation is much smaller than the intra-user variation in handwriting styles An allograph classifier can attempt to predict not only the character label but also the writing style of the character. On the non-personalized dataset, the allograph classifier can achieve an error rate of 24.65%, which can be interpreted as a very large error rate.

However, when the 2002 character styles are folded into their associated 100 character classes (e.g., implementing a simple folder in cascade), the error rate drops to 8.25%. For any given character, the simple folder can return the sum of the allograph outputs corresponding to that character.

It is to be appreciated that a better folder can account for confusable allographs among different classes. When a simple linear folder (e.g., learned weighted sum over all 2002 outputs) is employed (as seen in FIG. 5 at 500), the unpersonalized test error rate drops to 5.9%. However, the error rate on the personalization test set dramatically increases to 11.40%. This increase in error rate (93%) is larger than that observed for the base recognizer (20%), indicating that the allograph distribution varies significantly between the 215 users in the non-personalization data set and the 21 users in the personalization data set. However, even though the allograph distribution varies, for any new user the probability distribution over the classifier outputs can be substantially similar over several samples. In other words, though the error rate increases, the new user errors can be predictable. Thus, the personalizer can learn to reduce these errors.

Figure 7:
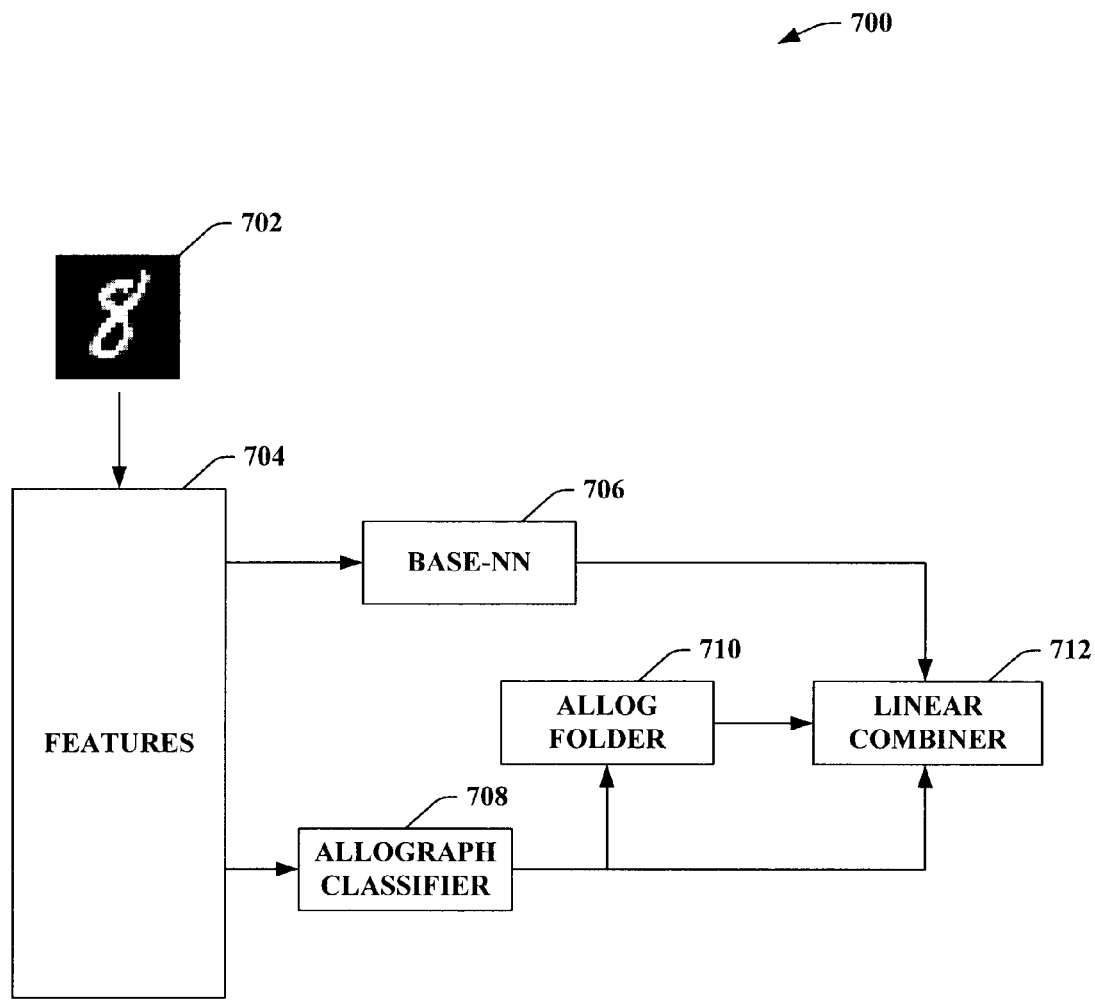
FIG. 7 illustrates a block diagram of an exemplary system that facilitates implementing an unpersonalized recognizer employing a linear combiner.

FIG. 7 illustrates a block diagram of an exemplary system 700 that facilitates implementing an unpersonalized recognizer employing a linear combiner. The system can include a handwritten character and/or symbol 702, a features 704, a base-NN 706, an allograph classifier 708, an allograph folder 710 (also referred to as "allog folder 710"), and a linear combiner 712. The character and/or handwritten symbol 702 can be utilized with the features 704, wherein the feature vector can be applied (as discussed above). The unpersonalized combiner can be a linear classifier that takes as input the 2002 outputs of the allograph classifier 708, the 100 outputs of the allograph folder 710, and the 100 outputs from the base classifier 706. These inputs can be mapped to the 100 output classes. The unpersonalized combiner can achieve a test error rate of 5.8% on the non-personalized data set and a corresponding 9.51% test error rate on the personalized data set. The performance is slightly improved.

Figure 8:
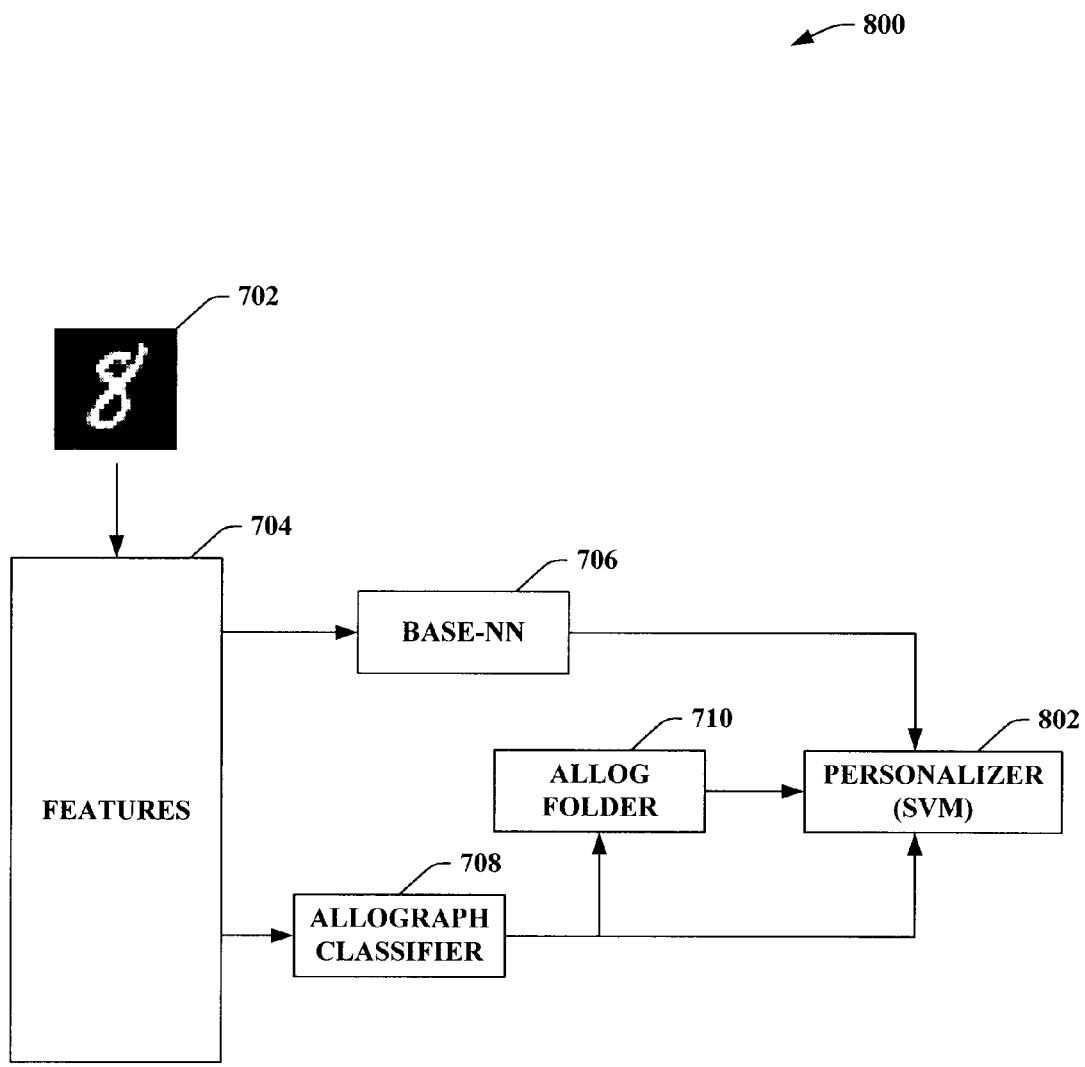
FIG. 8 illustrates a block diagram of an exemplary system that facilitates recognition of handwriting characters employing a personalizer support vector machine.

FIG. 8 illustrates a block diagram of an exemplary system 800 that facilitates recognition of handwriting characters employing a personalizer support vector machine. The system 800 illustrates a personalized recognizer that can employ a personalizer (SVM) that can be substantially similar to the personalizer (SVM) described above and in particular FIG. 6. The unique personalized recognizer can be built for each of the 21 users in the personalized data sets. The personalizer can reduce the mean error rate from 9.51% to 5.64%. This relative reduction in error rate of over 40.6% indicates that the personalizer can be effective in tuning the recognizer to each of the individual users.

Figure 9:
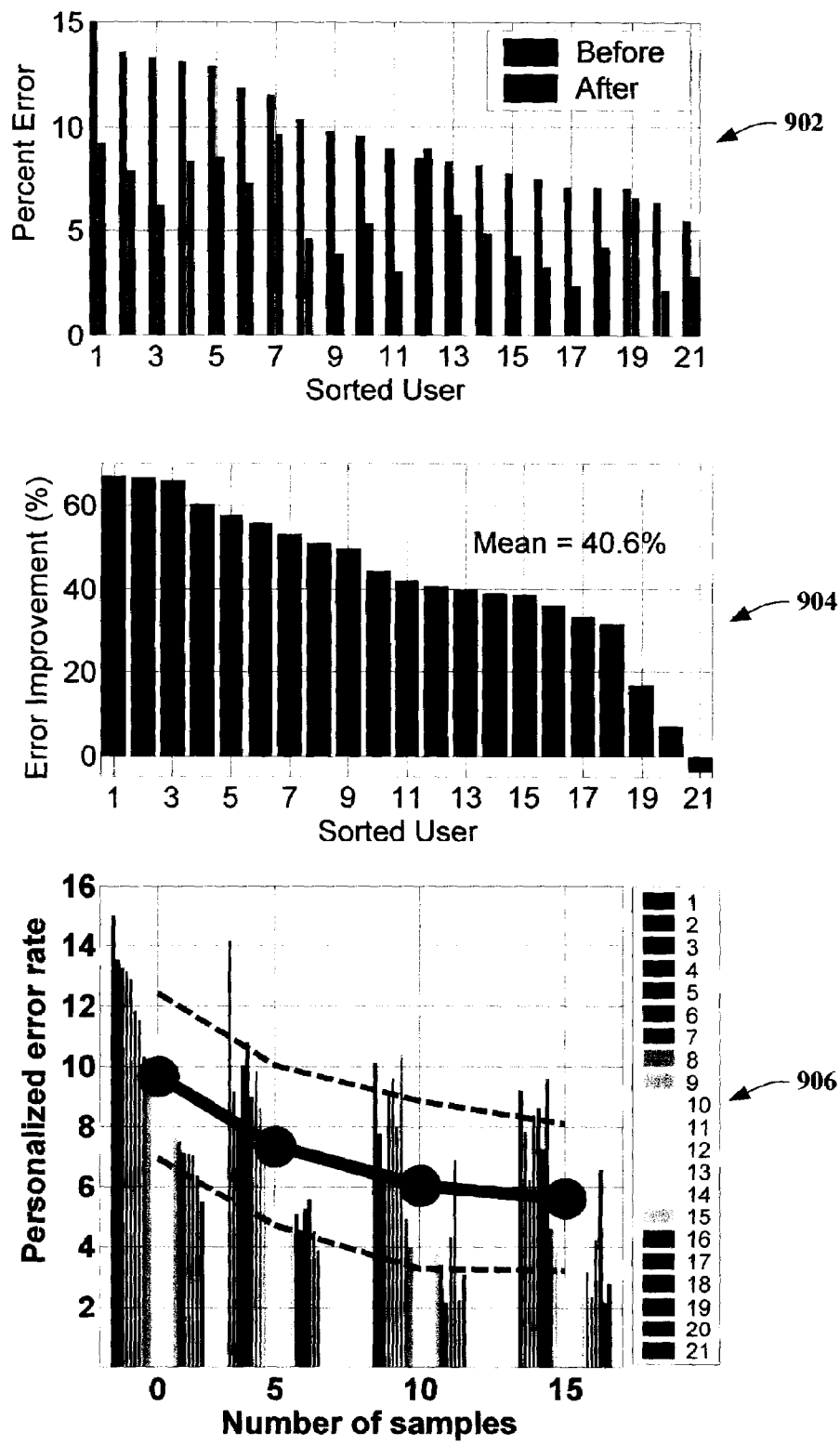
FIG. 9 illustrates graphed results in accordance with the subject innovation.

Turning to FIG. 9, graphed results in accordance with the subject innovation. A graph 902 and a graph 904 illustrate the error rates for each of the users before and after personalization using 15 samples. The personalizer of FIG. 8 can reduce the error rate for 20 of the 21 users. However, on one user (e.g., user 12 associated with graph 902), the number of errors increased slightly by 3.7% (e.g., relative increase).

The training time for each personalizer can be less than 300 seconds (e.g., 5 minutes). Each pair-wise SVM classifier (e.g., taking 8 samples for the first class and 8 samples for the second class) can take about 0.27 milliseconds to train on a 3.0 GHz processor machine. Training 4950 pair-wise classifiers may take 1.33 seconds. However, this can be repeated for each of the 255 (C,γ) settings for model selection using grid search. Using more advanced model selection methods can reduce this by one or two orders of magnitude. Further reduction in training times can be achieved by building only those pair-wise classifiers that correspond to the largest values in the confusion matrix. Class pairs that have no confusion can be dropped from the personalizer. With all unpersonalized error rates under 15%, for the 100 class problem utilized, the simple approach can produce speed improvements of over 6 times. Further, such an approach can be implemented when the number of classes is very large. For example, East-Asian languages (e.g., Japanese, Chinese, Korean, etc.) typically have several thousand characters. User can be expected to provide a few samples only for the most misrecognized characters. Further, most uses may utilize only a small fraction of these characters.

During personalization, the greater the number of samples required from the user, the lower the personalized error rate, but greater the user discomfort. Further, the rate of improvement diminishes with increasing number of samples. Personalization experiments can be repeated with 5, 10, and 15 samples (e.g., per character) from each user. A graph 906 can illustrate personalized error rate as a function of the number of user samples.

The personalized error rate was 7.37%, 6.06%, and 5.64%, with 5, 10, and 15 samples from the user. These values can correspond to a relative reduction of 23%, 36%, and 41%, respectively. The drop in error rate can be the highest in the first five samples. The error rate continues to decrease after 15 samples. However, given the rate of improvement, it appears that collecting more than 10 or 15 samples from the user may not warrant the subsequent reduction in the error rate, yet this can be determined by a particular user preference and is not to be limited on the subject innovation.

In another example, the number of training samples can be expanded through the judicious use of ink based distortions. A simple distortion model can be assumed or built from existing ink samples (from the non-personalization set). The model can then be used to produce a 10-20 fold increase in the user samples. Using distortions can be effective in designing image based classifiers.

Figure 10:
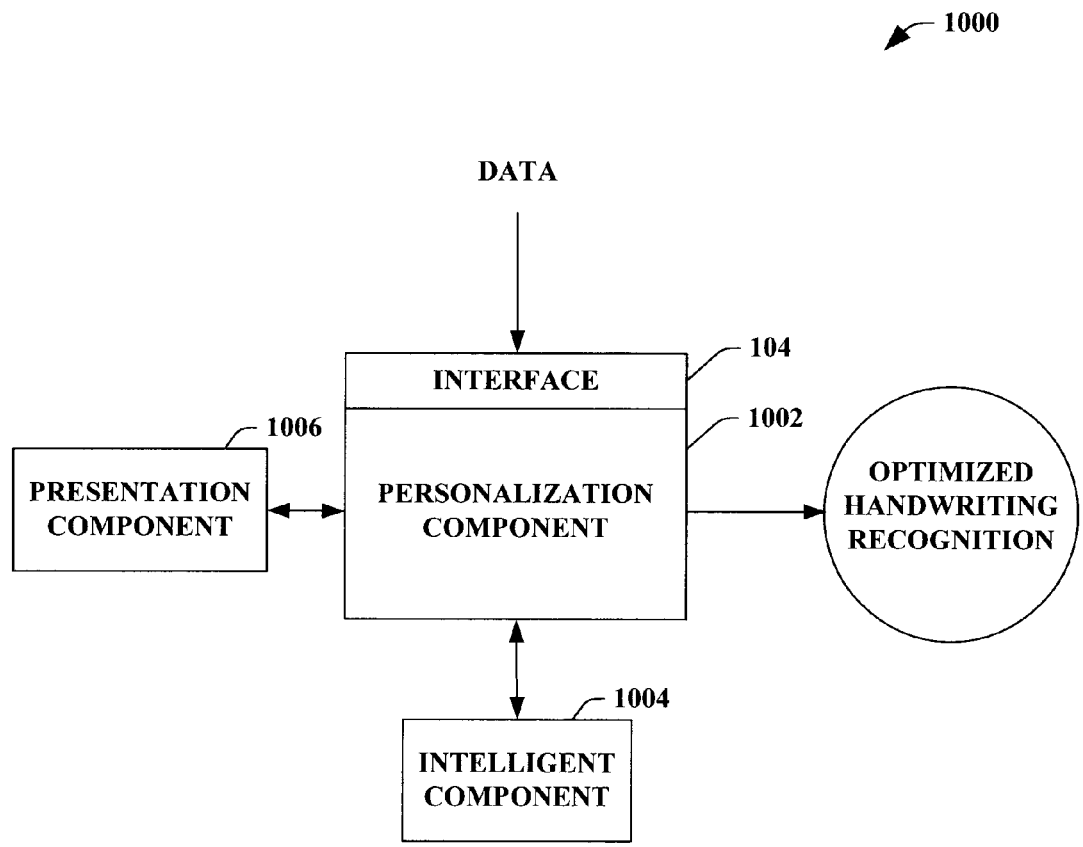
FIG. 10 illustrates a block diagram of an exemplary system that facilitates recognizing a character associated with handwriting utilizing an allograph trained classifier.

FIG. 10 illustrates a block diagram of an exemplary system 1000 that employs intelligence to facilitate recognizing a character associated with handwriting utilizing an allograph trained classifier. The system 1000 can include a personalization component 1002, the interface 104, data, and optimized handwriting recognition that can all be substantially similar to respective components, data, and recognition described in previous figures. The system 1000 further includes an intelligent component 1004. The intelligent component 1004 can be utilized by the personalization component 1002 to provide optimized handwriting character recognition utilizing allograph classifiers and non-allograph classifiers. For example, the intelligent component 1004 can infer handwriting characters, deterioration of handwriting characters, region specific packages, association with allographs, etc.

It is to be understood that the intelligent component 1004 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 1006 can provide various types of user interfaces to facilitate interaction between a user and any component coupled to the personalization component 1002. As depicted, the presentation component 1006 is a separate entity that can be utilized with the personalization component 1002. However, it is to be appreciated that the presentation component 1006 and/or similar view components can be incorporated into the personalization component 1002 and/or a stand-alone unit. The presentation component 1006 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the personalization component 1002.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 11:
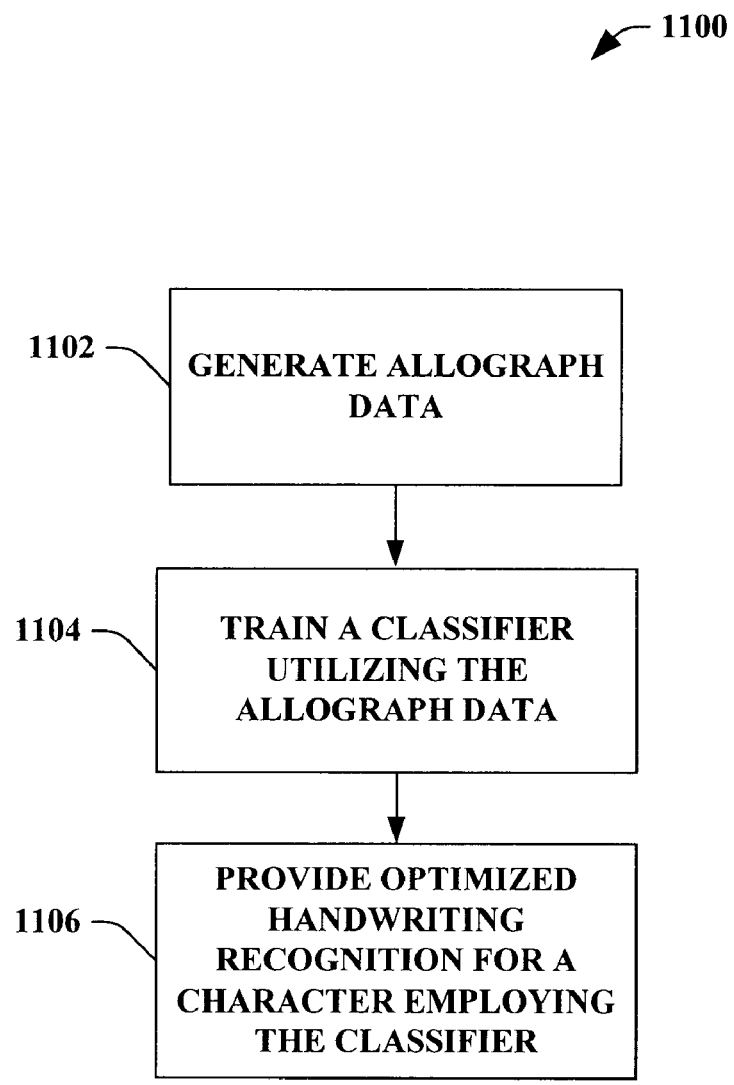
FIG. 11 illustrates an exemplary methodology for training at least one classifier with allograph data to provide handwriting recognition.
Figure 12:
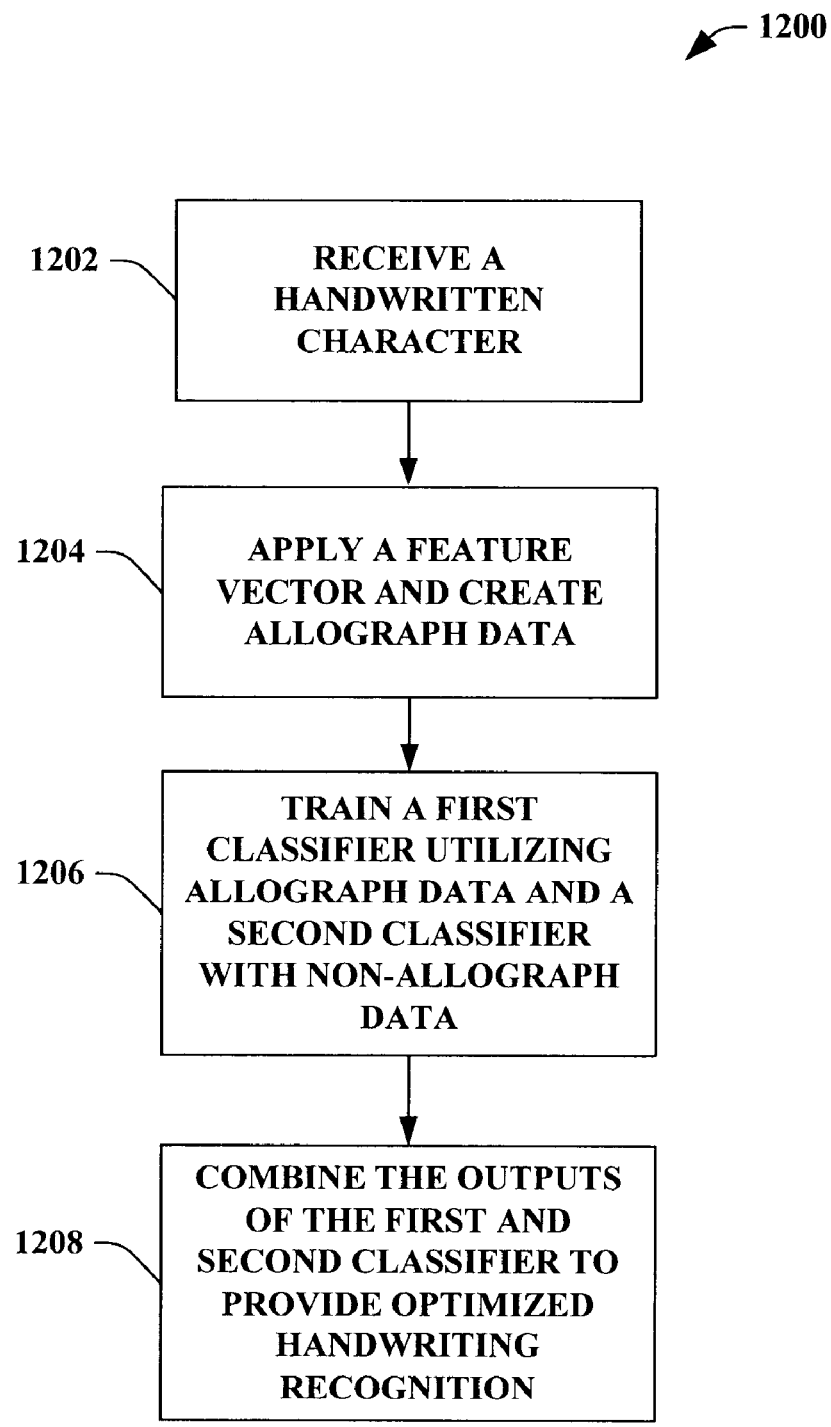
FIG. 12 illustrates an exemplary methodology that facilitates providing optimized handwriting recognition.

FIGS. 11-12 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 11 illustrates a methodology 1100 for training at least one classifier with allograph data to provide handwriting recognition. At reference numeral 1102, allograph data can be generated. The allograph data can be generated automatically, manually, and/or any combination thereof. For instance, the allograph data can be automatically generated employing any suitable clustering technique (discussed infra). In other words, an automatic approach for identifying allographs (e.g., character shapes and/or styles) from handwritten characters through clustering can be implemented. In another example, the allograph data can be manually provided utilizing a handwriting expert to provide types and/or styles associated with handwriting based on, for instance, geographic regions, school districts, a language, and a style of writing etc. It is to be appreciated that handwritten character styles can exist that can be termed "allographs" that a user can loosely adhere. There have been attempts to build a catalog of western handwritten styles, but none exist to date. Nonetheless, within the school system of any specific country, there are a handful of handwriting styles that are taught, with a particular style being adopted in any given school district.

At reference numeral 1104, a classifier can be trained utilizing the allograph data. For instance, an allograph-neural network (NN) recognizer can be in cascade with a linear classifier, wherein the outputs from the NN can map the character feature vector to character allograph data. A linear combiner (e.g., allograph-folder) can be trained using the allograph data. It is to be appreciated that the allograph-trained classifier can be combined with a non-allograph trained classifier to improve accuracy for handwriting recognition. At reference numeral 1106, optimized handwriting recognition can be provided for a handwritten character by employing the classifier trained with allograph data.

FIG. 12 illustrates a methodology 1200 that facilitates providing optimized handwriting recognition. At reference numeral 1202, a handwritten character can be received on which handwriting recognition can be implemented. At reference numeral 1204, an allograph can be created and a feature vector can be utilized. The allograph can be created automatically, manually, and/or any combination thereof. For instance, the allograph can be automatically created utilizing clustering (e.g., described above).

At reference numeral 1206, a first classifier can be trained with the allograph data and a second classifier can be trained with non-allograph data. The first classifier can be an allograph classifier (e.g., allograph-NN as described above). The second classifier can be a base classifier (e.g., base-NN as described above). At reference numeral 1208, the outputs of the first and second classifiers can be combined. The combination of the outputs can be implemented by any suitable combiner such as, but not limited to, a linear classifier (e.g., lin-combiner), a personalizer, RBF kernel, support-vector machine (SVM), etc. By combining the outputs of the first and second classifier, optimized and superior handwriting recognition can be provided for the received handwritten character.

Figure 13:
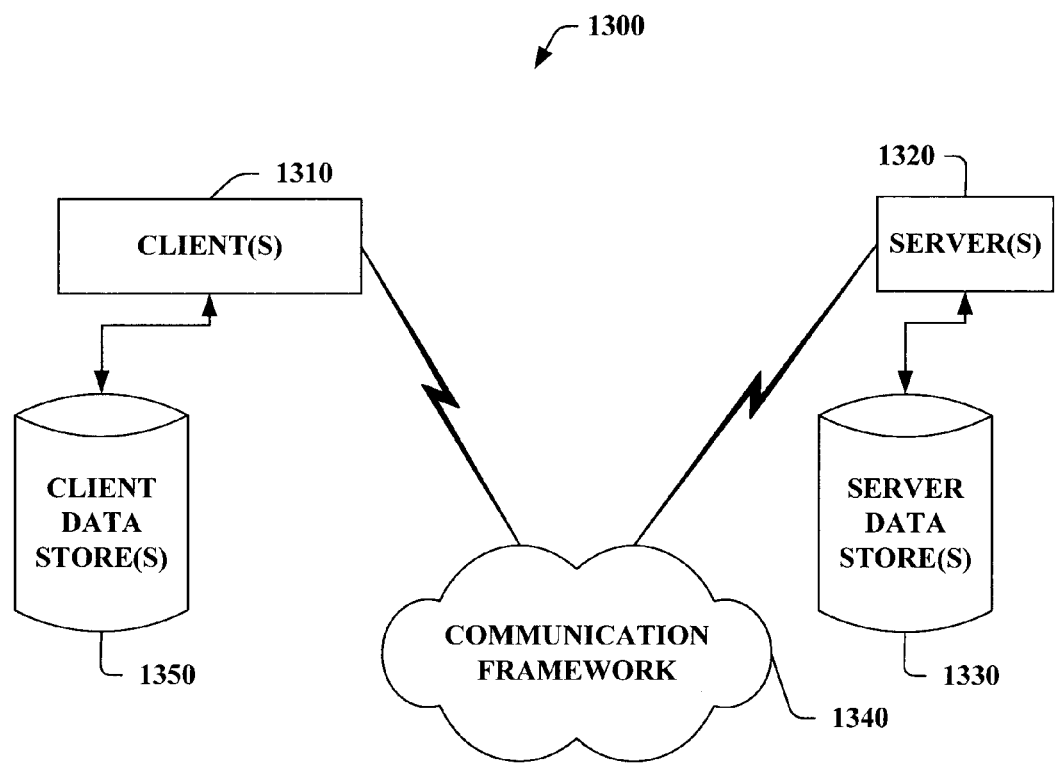
FIG. 13 illustrates an exemplary networking environment, wherein the novel aspects of the claimed subject matter can be employed.
Figure 14:
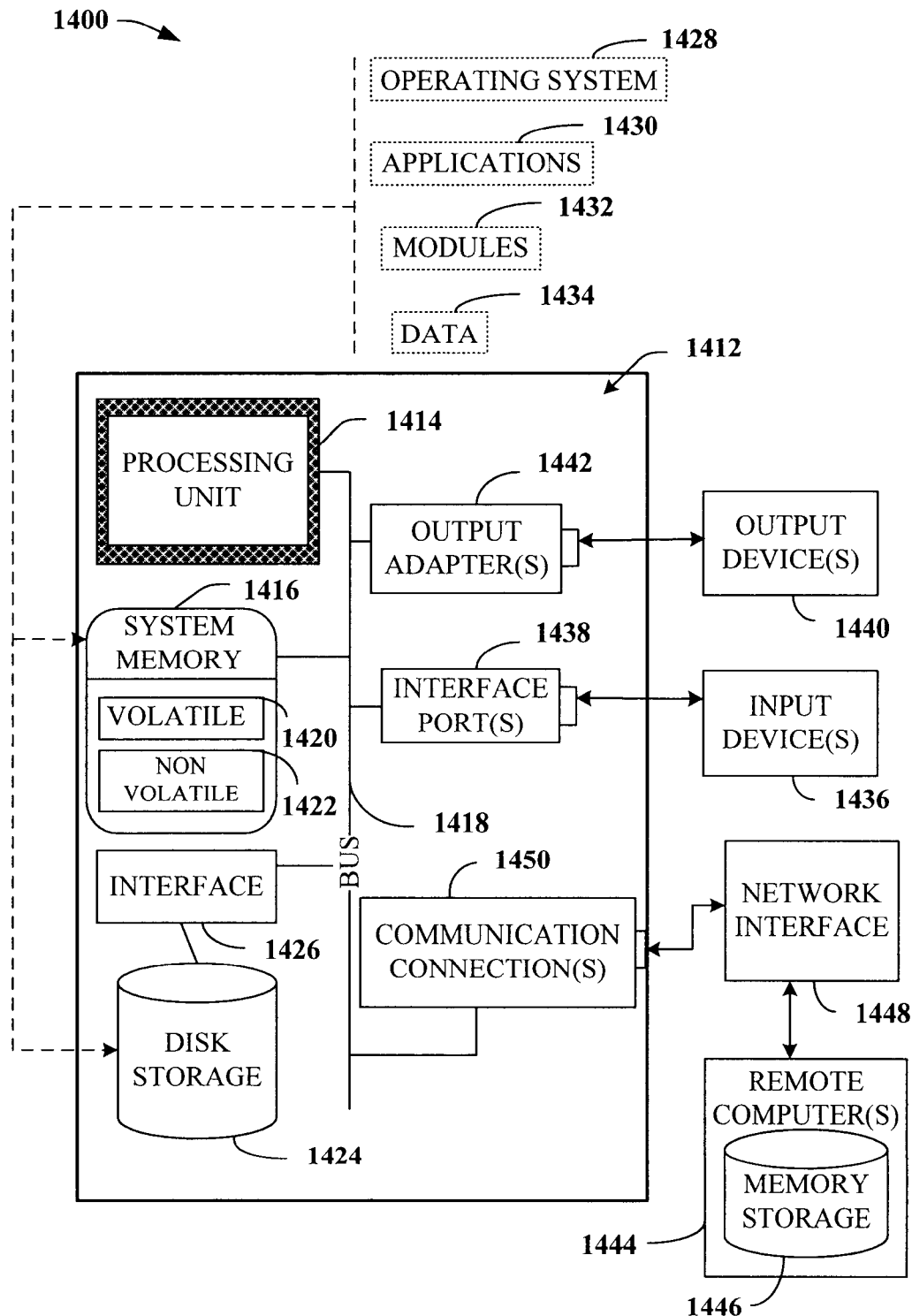
FIG. 14 illustrates an exemplary operating environment that can be employed in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. For example, a personalization component provides optimized and/or enhanced handwriting recognition utilizing at least one classifier trained with allograph data, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates analyzing handwriting, comprising:
    an interface component that receives at least one handwritten character;
    a classifier comprising an allograph neural network trained using allograph data relating to at least one handwriting style and a base neural network trained using non-allograph data;
    a combine component that combines outputs from the allograph neural network and the base neural network; and
    a personalization component that employs the combined outputs of the classifier to provide handwriting recognition for the at least one handwritten character.

2. The system of claim 1, further comprising an allograph component that generates the allograph data used to train the allograph neural network.

3. The system of claim 2, the allograph component automatically generates the allograph data utilizing a clustering technique that groups handwritten characters into clusters, each cluster representing a style of a handwritten character.

4. The system of claim 3, the clustering technique is a hierarchical agglomerative clustering approach utilizing dynamic time warping as a distance measure.

5. The system of claim 2, the results of the clustering technique are visualized using at least one of a binary tree or a dissimilarity dendogram.

6. The system of claim 1, wherein the allograph neural network and base neural network utilize a polynomial feature technique to provide inputs thereto.

7. The system of claim 1, wherein the allograph neural network is trained to accept feature vectors for handwritten characters as inputs and to map the feature vectors to character allographs.

8. The system of claim 7, the allograph neural network utilizes at least one of a simple folder, a linear folder, or an allograph folder to map the character allographs to character classes.

9. The system of claim 8, wherein the at least one of a simple folder, a linear folder, or an allograph folder is trained using gradient descent to map the character allographs to the character classes.

10. The system of claim 7, wherein the feature vectors are derived for a handwritten character by segmenting the handwritten character and representing each resulting segment in the form of a Chebyshev polynomial.

11. The system of claim 1, wherein the base neural network is trained to accept feature vectors for handwritten characters as inputs and to map the feature vectors to character classes.

12. The system of claim 1, the combine component employs at least one of a linear combiner or a linear classifier.

13. The system of claim 1, the combine component employs a combiner classifier that learns from data.

14. The system of claim 13, the combiner classifier is a support vector machine.

15. The system of claim 14, the support vector machine learns to optimally combine the allograph neural network output and the base neural network output utilizing a handwriting sample from a user.

16. The system of claim 1, the personalization component infers the handwritten character taking in account a deterioration of quality due to fatigue.

17. The system of claim 1, the allograph data is based at least in part upon at least one of the following: a geographic region, a school district, a language, or a style of writing.

18. A method that facilitates handwriting recognition, comprising:
    employing a processor having computer-executable instructions embodied on a computer-readable storage medium to perform the following acts:
    generating allograph data;
    training a first classifier using the allograph data;
    training a second classifier using non-allograph data;
    receiving a handwritten character;
    deriving a feature vector for the handwritten character;
    employing the first classifier to map the feature vector to character allographs and to fold the character allographs into their associated characters;
    employing the second classifier to map the feature vector directly to one or more specific characters;
    combining outputs from the first and second classifiers; and
    employing the combined outputs to provide handwriting recognition for the handwritten character.

19. The method of claim 18, further comprising:
    combining the outputs of the first and second classifier utilizing at least one of a linear combiner, a personalizer, a support vector machine (SVM), or a combiner classifier.

20. A machine-implemented system that facilitates analyzing handwriting, comprising:
    means for receiving at least one handwritten character;
    means for training a first recognizer using allograph data;
    means for training a second recognizer using non-allograph data;
    means for combining outputs of the first and second recognizers; and
    means for employing the combined outputs to provide handwriting recognition for the at least one handwritten character.

* * * * *